United States Patent
Gerrits et al.

(10) Patent No.: US 10,843,546 B2
(45) Date of Patent: Nov. 24, 2020

(54) FASTENING SYSTEM FOR FASTENING A DRIVE UNIT TO A VEHICLE BODY

(71) Applicant: Bayerische Motoren Werke Aktiengesellschaft, Munich (DE)

(72) Inventors: Niklas Gerrits, Unterhaching (DE); Joerg Hirschhausen, Munich (DE); Alexander Kronbeck, Munich (DE); Zisis Nanos, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/402,940

(22) Filed: May 3, 2019

(65) Prior Publication Data
US 2019/0255932 A1    Aug. 22, 2019

Related U.S. Application Data

(63) Continuation of application No. PCT/EP2017/075656, filed on Oct. 9, 2017.

(30) Foreign Application Priority Data

Nov. 4, 2016   (DE) .................. 10 2016 221 653

(51) Int. Cl.
  *B60K 5/12* (2006.01)
  *B60K 5/02* (2006.01)
  *B62D 21/11* (2006.01)

(52) U.S. Cl.
  CPC .............. *B60K 5/1216* (2013.01); *B60K 5/02* (2013.01); *B62D 21/11* (2013.01)

(58) Field of Classification Search
  CPC ...... B60K 5/02; B60K 5/1216; B60K 5/1283; B62D 21/11
  See application file for complete search history.

(56) References Cited

U.S. PATENT DOCUMENTS

| 2,034,764 A | * | 3/1936 | Lee | ....................... | B60K 5/1216 |
| | | | | | 248/606 |
| 2,378,874 A | * | 6/1945 | Trott | .................... | B60K 5/1216 |
| | | | | | 248/607 |

(Continued)

FOREIGN PATENT DOCUMENTS

| DE | 33 31 417 A1 | 3/1984 |
| DE | 35 43 835 A1 | 7/1987 |

(Continued)

OTHER PUBLICATIONS

International Search Report (PCT/ISA/210) issued in PCT Application No. PCT/EP2017/075656 dated Dec. 21, 2017 with English translation (eight (8) pages).

(Continued)

*Primary Examiner* — Steve Clemmons
(74) *Attorney, Agent, or Firm* — Crowell & Moring LLP

(57) ABSTRACT

A fastening system for fastening a drive unit to a vehicle body includes at least three vibration-damping elements and at least one additional spring element and/or damping element for mounting the drive unit arranged on the vehicle body. The additional spring element and/or damping element is arranged between the drive unit and the vehicle body such that the main effective direction of the additional spring element and/or damping element extends substantially in the vehicle longitudinal direction.

6 Claims, 1 Drawing Sheet

(56) References Cited

U.S. PATENT DOCUMENTS

| | | | |
|---|---|---|---|
| 4,564,082 A | 1/1986 | Takehara et al. | |
| 4,889,207 A | 12/1989 | von Broock | |
| 8,776,939 B2 * | 7/2014 | Kuramoto | B60K 5/02 |
| | | | 180/292 |

FOREIGN PATENT DOCUMENTS

| | | | |
|---|---|---|---|
| DE | 102 23 517 A1 | 12/2002 | |
| DE | 102 06 472 A1 | 8/2003 | |
| DE | 103 34 901 A1 | 2/2005 | |
| DE | 10334901 A1 * | 2/2005 | ......... B60K 5/1216 |
| DE | 10 2005 023 265 A1 | 11/2006 | |
| DE | 10 2011 079 111 A1 | 1/2013 | |
| EP | 0 279 875 A1 | 8/1988 | |
| JP | 8-282303 A | 10/1996 | |

OTHER PUBLICATIONS

German-language Written Opinion (PCT/ISA/237) issued in PCT Application No. PCT/EP2017/075656 dated Dec. 21, 2017 (six (6) pages).

German-language Office Action issued in counterpart German Application No. 10 2016 221 653.8 dated Aug. 14, 2017 (two (2) pages).

\* cited by examiner

FASTENING SYSTEM FOR FASTENING A DRIVE UNIT TO A VEHICLE BODY

CROSS REFERENCE TO RELATED APPLICATIONS

This application is a continuation of PCT International Application No. PCT/EP2017/075656, filed Oct. 9, 2017, which claims priority under 35 U.S.C. § 119 from German Patent Application No. 10 2016 221 653.8, filed Nov. 4, 2016, the entire disclosures of which are herein expressly incorporated by reference.

BACKGROUND AND SUMMARY OF THE INVENTION

The invention relates to a fastening system for fastening a drive unit to a vehicle body. With regard to the prior art, reference is made by way of example to DE 10 2011 079 111 A1.

The engine-transmission unit of a motor vehicle is usually referred to as a drive unit. The drive unit is mounted flexibly on the vehicle body, for example, via engine bearings, transmission bearings and torque supports. The unit bearings absorb the static load of the engine-transmission unit and limit the maximum travel during load changes or at high torques. For example, the introduction of structure-borne sound due to excitation of the engine and transmission into the superstructure is attempted to be effectively suppressed here in order to configure vibrations, the vibration comfort and the interior noise level to be comfortable for occupants of the vehicle over the entire rotational speed range of the engine.

An important parameter for configuring the unit bearings, alongside, for example, the available construction space and the type of load, is the maximum forces and the installed position of the unit. As types of load, it is possible at the bearings for forces in the axial and radial direction and moments in the form of torsion and cardanic forces to occur. As a result of flexible mountings, the drive unit can carry out translational and rotational movements. The drive unit together with its bearings thus acts as a spring-mass system. All of the bearings of a drive unit mutually affect one another and therefore have to be coordinated with one another. In order to cover all of the forces which occur, a drive unit of a vehicle is customarily mounted on the vehicle body, i.e. on the vehicle superstructure, for example on the axle supports, via two engine bearings and a transmission bearing as supporting bearings.

The sometimes contradictory requirements with respect to damping and rigidity are difficult for the configuration of such unit mountings. For example, it is desirable because of acoustic requirements to configure the mounting to be as soft as possible. However, for vibration comfort reasons, stiff mounting of the drive unit is desirable since the intention is for no undesirable carriageway- or drive-excited coupling vibrations to occur. Since it is difficult in practice to meet all of these different requirements, vibrations leading to undesirable noises or vibrations continue to occur.

One known undesirable vibration behavior here is what is referred to as engine juddering. Engine juddering denotes a resonance vibration of the drive unit (mainly) in the vertical direction of the vehicle, but, under some circumstances, also in the longitudinal direction of the vehicle. It arises, for example, when travelling over an averagely poor to poor carriageway, such as, for example, a concrete motorway or when running over verges. An excitation frequency arises there from the distance between joints and the driving speed. If said excitation frequency coincides with the resonance frequency of the flexibly mounted drive unit, engine juddering occurs.

Said engine juddering constitutes just one example of many further possible coupling vibrations which may occur because of said conflicts of objectives between the different requirements. There are various possibilities here for counteracting such conflicts of objectives.

DE 10 2011 079 111 A1 thus discloses a unit fastening system for vibratory securing of units of a drive to a superstructure and/or to a chassis of a motor vehicle by way of vibration-damping elements, of which at least three are mounted as supporting bearings on the unit, as seen in the direction of the vertical axis, in the region below the center of gravity of said unit. At least one further vibration-damping element is arranged here in the longitudinal and transverse direction of the vehicle in the vicinity of the center of gravity of the unit and above the center of gravity of the unit in the direction of the vertical axis of the vehicle. Such an arrangement is intended to ensure optimized vibration isolation between the drive unit and the vehicle body, with the intention being to improve the comfort in respect of, for example, juddering.

A further tried and tested technique for avoiding undesirable vibrations is the use of what are referred to as active bearings which, depending on configuration, are capable of damping to a differing extent and in different directions with the aid of integrated actuators. However, such active mountings have a complex structure and, because of additionally required components, such as, for example, a hydraulic pump, a sensor arrangement and other components, take up an increased construction space and cause additional weight.

Although it is also possible for the rigidity and therefore the vibration behavior of the drive unit to be changed by changing the rubber mixtures of conventional engine bearings, a targeted, direction-dependent change for damping a vibration acting only in one specific direction is not possible without losses of the vibration behavior in other directions in space. This is because the change in the rubber properties causes the rigidity in all coordinate directions on a unit mounting to be changed.

It is therefore the object of the invention to provide a fastening system for fastening a drive unit to a vehicle body, which fastening system is capable of solving the conflicting objectives between acoustics and vibration comfort and, in the process, satisfy the different requirements demanded of the unit mountings.

The object is achieved by a fastening system for fastening a drive unit to a vehicle body in accordance with the claimed invention.

A fastening system for fastening a drive unit of a motor vehicle to a vehicle body comprises at least three vibration-damping elements. In addition to said vibration-damping elements, an additional spring and/or damping element is arranged for mounting the drive unit on the vehicle body. According to the invention, said additional spring and/or damping element is arranged between the drive unit and the vehicle body in such a manner that its main direction of action runs at least predominantly or substantially in the longitudinal direction of the vehicle.

Within the context of the invention, a drive unit of a motor vehicle, in particular of a two-track motor vehicle, is preferably understood as meaning what is referred to as an engine-transmission unit. The engine-transmission unit is preferably positioned here in the vehicle in such a manner that the transmission is arranged behind the engine, as viewed in the longitudinal direction of the vehicle. This is particularly preferably what is referred to as a longitudinally installed engine-transmission unit, in which the output shaft of the drive unit is arranged in the longitudinal direction of the vehicle.

In addition to an engine-transmission unit, the drive unit can also constitute an electric motor or similar.

The drive unit is supported or mounted on a vehicle body, i.e., for example, on a vehicle superstructure or an axle support.

The mounting of the drive unit on the vehicle body here comprises at least three vibration-damping elements. Such vibration-damping elements preferably constitute two of what are referred to as engine bearings and one transmission bearing. The two engine bearings preferably support the engine, and the transmission bearing the transmission, on the vehicle body in a vibratory manner. In particular the transmission bearing here is preferably arranged in such a manner that its main direction of action is in particular oriented in the vertical direction of the vehicle. Such engine bearings and transmission bearings can be designed, for example, as flexibly deformable rubber bearings or as vibration-damping hydraulic bearings (hydraulically acting bearings).

Said additional spring and/or damping element, like the other vibration-damping elements, can be designed as a rubber bearing or as a hydraulic bearing or similar.

As has already been mentioned, it is provided that the additional spring and/or damping element is arranged in such a manner that it substantially acts in the longitudinal direction of the vehicle. Within the context of this invention, substantially refers to the main direction of action of the additional spring and/or damper element. Within the context of the invention, the main direction of action refers to a direction in which the suspension and/or damping of the spring and/or damping element acts mainly or for a predominant portion. In the case of a flexibly deformable rubber bearing, for example, the main direction of action is the direction in which, in the event of excitation, the highest vibration excitation should be anticipated and which accordingly decisively determines the configuration of the bearing in respect of basic rigidity and damping.

By means of the arrangement of the spring and/or damping element in such a manner that its main action is oriented in the longitudinal direction of the vehicle, the rigidity or a rigidity of the unit arrangement can be coordinated in a desired direction (in this case in the longitudinal direction of the vehicle), independently of other directions. This has the advantage that the drive unit can be mounted in the longitudinal direction of the vehicle with a precisely determinable rigidity, and the additional spring and/or damping element can take over the entire vibration damping of the drive unit in the longitudinal direction of the vehicle.

In a preferred embodiment of the invention, two additional spring and/or damping elements are arranged on the drive unit, which spring and/or damping elements are arranged between the drive unit and the vehicle body in such a manner that their main direction of action runs at least predominantly in the longitudinal direction of the vehicle.

If the main direction of action of the additional spring and/or damping element is in the longitudinal direction of the vehicle, said mounting or support of the drive unit has no effect or no influence on a different direction, such as, for example, on the vibration capability of the drive unit in the vertical direction of the vehicle. The conflict of objectives between a soft suspension and/or damping in the vertical direction of the vehicle for acoustic reasons, on the one hand, and a stiff suspension and/or damping in the longitudinal direction of the vehicle for vibration comfort reasons, on the other hand, can be advantageously solved by the action in just one direction of the additional spring and/or damping element.

The additional spring and/or damping element here is preferably of comparatively stiff design in the longitudinal direction of the vehicle so that a maximum or optimum support of the drive unit in the longitudinal direction of the vehicle is made possible.

In a further preferred embodiment of the invention, the at least one additional spring and/or damping element is designed to be adjustable in its positioning in such a manner that the suspension or damping of the additional spring and/or damping element acts in an additional secondary direction of action. Said additional secondary direction of action particularly preferably runs in the transverse direction of the vehicle. If therefore, for example, the positioning of the spring and/or damping element is minimally changed, the direction of action thereof therefore also changes. If the spring and/or damping element is accordingly adjusted in its positioning in such a manner that its main direction of action (originally running exclusively in the longitudinal direction of the vehicle) differs minimally from the longitudinal direction of the vehicle, in addition to the longitudinal direction of the vehicle (as main direction of action), a further resulting direction of action (a secondary direction of action) arises which preferably constitutes the transverse direction of the vehicle.

Consequently, the suspension and/or damping of the spring and/or damping element no longer acts only in one direction (namely the longitudinal direction of the vehicle), but additionally (at least minimally) also in, for example, the transverse direction of the vehicle.

The positioning of the spring and/or damping element can be changed or adjusted depending on the desired rigidity in the desired direction (i.e. whether in the transverse direction of the vehicle and/or longitudinal direction of the vehicle).

Said adjustment can take place here, for example, by means of a screw connection or another adjustment mechanism. Possible adjustability is in no way absolutely necessary here. The spring and/or damping element can equally also be arranged on the drive unit permanently (non-adjustably) in one of the positions mentioned.

In a preferred exemplary embodiment, the at least one additional spring and/or damping element is of at least approximately cylindrical design, wherein the direction of action of the spring and/or damping element runs in the direction of the cylinder longitudinal axis of same.

A substantially or at least approximately cylindrical shape is understood here as meaning a rod-like shape with a longitudinal axis, which can differ from the circular circumferential surface of a circular cylinder and can also have different circumferential shapes.

In order to permit the drive unit with the spring and/or damping element to be maximally supported in a manner acting only in one direction, the cylinder longitudinal axis and therefore the direction of action of the spring and/or damping element is preferably oriented in the longitudinal direction of the vehicle.

Alternatively thereto, in the installed state, it is possible for the cylinder longitudinal axis and therefore the resulting direction of action of the additional spring and/or damping element to be able to be oriented or to be oriented in a further direction, which direction runs at a certain angle with respect to the longitudinal direction of the vehicle. In order here to avoid that the additional spring and/or damping element has an influence on the vibration behavior of the drive unit in the vertical direction of the vehicle, the cylinder longitudinal axis is preferably arranged in a plane which is parallel to a horizontal plane of the vehicle.

Depending on the size of the angle set between the longitudinal direction of the vehicle and the cylinder longitudinal axis of the additional spring and/or damping element, a secondary direction of action can result, which, in addition to forces and/or vibrations in the longitudinal direction of the vehicle, is additionally capable of cushioning and/or damping those in the transverse direction of the vehicle.

Preferably, however, even in the event of such a set or angled arrangement of the spring and/or damping element, the setting angle is selected in such a manner that most of the rigidity acts in the longitudinal direction of the vehicle and only a small portion in the transverse direction of the vehicle, thus resulting in the designations of a main direction of action and secondary direction of action.

An advantage in the case of the angled or set arrangement of the additional spring and/or damping element is that the additional spring and/or damping element carries out a shearing movement under an extreme load or force in the longitudinal direction of the vehicle. A failure point or a predetermined shearing point which fails in high load situations is therefore specifically produced, and therefore, for example, damage to further components (such as, for example, metal parts) of the drive unit can be avoided.

In a further refinement of the invention, the additional spring and/or damping element connects the transmission as part of the drive unit to the vehicle body. It is preferred here for the additional spring and/or damping element to be arranged on that same side wall of the drive unit on which the transmission mounting is also arranged. The additional spring and/or damping element can also be arranged on that side wall of the drive unit which constitutes the transmission end or the rear end wall of the drive unit and at which the output shaft emerges. In addition, the additional spring and/or damping element is preferably arranged in the direct vicinity of the transmission bearing.

The action of the additional spring and/or damping element is parallel to the action of the transmission bearing. The additional spring and/or damping element is therefore not arranged serially with respect to the transmission bearing, but rather as a spring and/or damping element acting parallel to the transmission bearing. In particular in respect of the available construction space and the prevailing lever ratios, such a positioning is of advantage.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
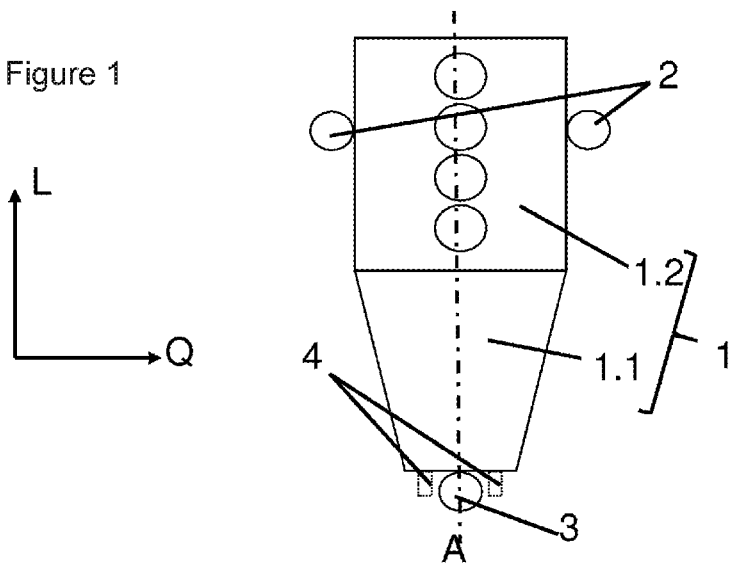
FIG. 1 is a schematic top view of a drive unit in its installed position in the vehicle and also a fastening system for fastening same to a vehicle body (not shown).

FIG. 1 shows a drive unit 1 of a motor vehicle in the installed state, said drive unit being fastened by an arrangement of bearings to the vehicle body (not depicted). The drive unit here constitutes a unit consisting of a transmission 1.1 and an engine 1.2, and this can also be referred to as an "engine-transmission unit".

In this specific case, the drive unit 1 is installed longitudinally in the vehicle, which means that an output shaft (not shown) of the drive unit 1 is arranged in the longitudinal direction L of the vehicle.

The engine 1.2 is supported here by two engine bearings 2, and the transmission 1.1 by a transmission bearing 3, on the vehicle body, i.e. either on the superstructure or on the chassis of the vehicle. The transmission bearing 3 and the engine bearings 2 can be designed here as hydraulic bearings or rubber bearings.

In addition, two further additional rubber bearings 4 are arranged on the drive unit 1 in order to support the latter, or more precisely the transmission 1.1, on the vehicle body. These additional rubber bearings are arranged on that same side wall on the transmission 1.1 on which the transmission bearing 3 is also arranged on the transmission 1.1. In the case of the longitudinally installed drive unit 1 that is illustrated here, the two additional rubber bearings 4 are each arranged symmetrically with respect to each other, with the unit longitudinal center axis A in this case constituting the line of symmetry. Such a symmetrical arrangement avoids further force influences due to unbalanced lever ratios in the case of a non-symmetrical arrangement. In the event of the use of only one additional spring, damping element or of an additional rubber bearing, the latter for the reasons just mentioned is preferably to be arranged on an axis which intersects the mass center of gravity of the drive unit.

The additional rubber bearings 4 are preferably of at least approximately cylindrical design. For example, said rubber bearings can be designed as what are referred to as stress concentration rubber bearings.

The two additional rubber bearings 4 here are arranged between the drive unit 1 and the vehicle body in such a manner that their main direction of action runs at least predominantly in the longitudinal direction L of the vehicle.

Although the use of two additional rubber bearings 4 is preferred in this case because of a more stable arrangement which is simpler with regard to the lever ratios, this in no way describes a compulsory feature. It is likewise also possible to arrange only one, or more than two, of the additional rubber bearings 4.

As can be seen in FIG. 1, the two additional rubber bearings 4 are arranged in the direct vicinity of the transmission bearing 3 or parallel thereto and behind a wheel rotational axis (not shown) of a front axle of the vehicle in the longitudinal direction of the vehicle. This preferred arrangement or position of the additional rubber bearings 4 affords advantages in particular with respect to the prevailing lever ratios (in particular of a longitudinally installed drive unit 1). Furthermore, at the position mentioned, the construction space necessary for the additional rubber bearings 4 is sufficiently available, with it being possible to avoid a conflict with other components.

Figure 2:
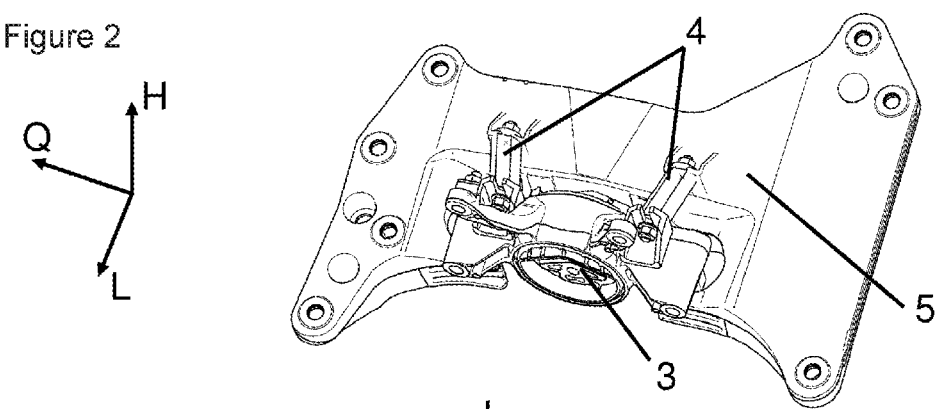
FIG. 2 is a detailed view of two additional spring elements arranged according to an embodiment of the invention, in a three-dimensional view.
Figure 3:
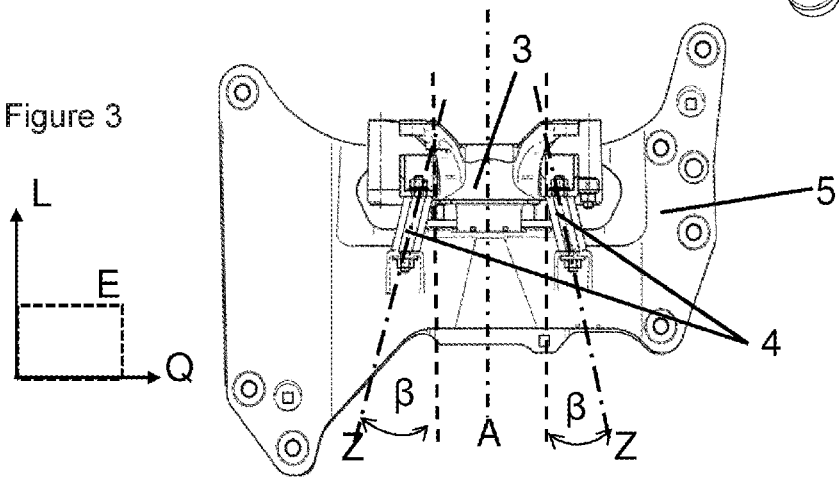
FIG. 3 is a top view of FIG. 2.

A more detailed arrangement of the additional rubber bearings 4 from FIG. 1 can be seen in FIG. 2 and FIG. 3 in a three-dimensional view (FIG. 2) and a top view (FIG. 3), respectively.

In these figures, the drive unit 1 is no longer shown, and instead the connection of the additional rubber bearings 4 and of the transmission bearing 3 (arranged parallel thereto) to a vehicle body 5.

The main direction of action of the transmission bearing 3 is customarily in the vertical direction H of the vehicle. The transmission bearing 3 is of comparatively soft design in the longitudinal direction of the vehicle. In order, however, to be able to maximally support the drive unit 1 in a direction-dependent manner, in this case in the longitudinal direction L of the vehicle, with a certain defined rigidity, the additional rubber bearings 4 are arranged. These additional rubber bearings 4 are designed as (at least approximately) cylindrical rubber bearings, the main direction of action of which constitutes the longitudinal direction L of the vehicle. This means that the spring action of said rubber bearings is formed predominantly in the longitudinal direction L of the vehicle. Undesirable vibrations of the drive unit 1 in the longitudinal direction L of the vehicle can thus be advantageously damped or reduced (in a direction-dependent manner) without significant influencing of other vibration movements in further directions.

In this specific case, the additional rubber bearings 4 are designed in such a manner that the direction of action thereof points in the direction of the cylinder longitudinal axis Z. This arrangement can be seen in particular in FIG. 3. The cylinder longitudinal axis Z therefore does not point precisely in the longitudinal direction L of the vehicle, but rather is inclined at a certain angle β with respect to the longitudinal axis L of the vehicle, as viewed in a horizontal plane E of the vehicle. As already mentioned, this angle is formed exclusively in a horizontal plane E of the vehicle, and it is thus possible to prevent a significant action of the additional rubber bearings 4 taking place in the vertical direction H of the vehicle. By means of this angled arrangement of the cylinder longitudinal axis Z or of the direction of action of the additional rubber bearings 4 within a horizontal plane E of the vehicle, in addition to the longitudinal direction L of the vehicle, a secondary direction of action running in the transverse direction Q of the vehicle results. Consequently, the additional rubber bearings 4 also (at least slightly) cushion vibrations of the drive unit 1 in the transverse direction Q of the vehicle.

The action in the direction of the transverse direction Q of the vehicle is formed to a greater or lesser extent depending on the magnitude of the angle β of the cylinder longitudinal axis Z or of the direction of action of the additional rubber bearings 4 with respect to the longitudinal direction L of the vehicle (within the horizontal plane E of the vehicle). However, it is preferred that the longitudinal direction L of the vehicle constitutes the main direction of action of the additional rubber bearings 4.

The angle β can be set here by adjustment of the position of the additional rubber bearings 4.

The described angular arrangement of the additional rubber bearings 4 is therefore particularly advantageous since it would fail in a very high load situation in the longitudinal direction L of the vehicle and therefore constitutes a specific shearing point. Other components can thus be protected from further damage in said load situation.

LIST OF REFERENCE SIGNS

1 Drive unit
1.1 Transmission
1.2 Engine
2 Engine bearing
3 Transmission bearing
4 Additional rubber bearings
5 Vehicle body
L Longitudinal direction of the vehicle
Q Transverse direction of the vehicle
H Vertical direction of the vehicle
Z Cylinder longitudinal axis
A Unit longitudinal center axis
β Angle between cylinder longitudinal axis and longitudinal direction of the vehicle
E Horizontal plane of the vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening system for fastening a drive unit to a vehicle body, wherein the drive unit includes a transmission and an engine, comprising:
   at least three vibration-damping elements, wherein a first and a second of the at least three vibration-damping elements are each a respective engine bearing arranged for mounting the engine on the vehicle body and a third of the at least three vibration damping elements is a transmission bearing arranged for mounting the transmission on the vehicle body; and
   at least one additional spring and/or damping element arranged for mounting the transmission on the vehicle body, wherein
   the at least one additional spring and/or damping element is arranged between the drive unit and the vehicle body such that a main direction of action thereof runs substantially in a longitudinal direction of the vehicle,
   the at least one additional spring and/or damping element has a substantially cylindrical design, and in an installed state, a cylinder longitudinal axis of the at least one additional spring and/or damping element is substantially oriented in the longitudinal direction of the vehicle,
   in the installed state, the cylinder longitudinal axis of the at least one additional spring and/or damping element is oriented in a further direction, which further direction runs at an angle with respect to the longitudinal direction of the vehicle, and
   the cylinder longitudinal axis is arranged in a plane which is parallel to a horizontal plane of the vehicle.

2. The fastening system as claimed in claim 1, wherein the at least one additional spring and/or damping element additionally acts in a secondary direction of action.

3. The fastening system as claimed in claim 2, wherein the secondary direction of action runs in a transverse direction of the vehicle.

4. The fastening system as claimed in claim 1, wherein the at least one additional spring and/or damping element is arranged on a same side wall of the drive unit on which the transmission bearing is arranged.

5. The fastening system as claimed in claim 1, wherein the at least one additional spring and/or damping element is a rubber bearing.

6. The fastening system as claimed in claim 1, wherein the at least one additional spring and/or damping element comprises hydraulic damping.

* * * * *